(12) United States Patent
Finkboner

(10) Patent No.: US 11,661,322 B1
(45) Date of Patent: May 30, 2023

(54) EXTENDABLE VEHICLE JACK

(71) Applicant: Gerald Finkboner, East Apple Valley, CA (US)

(72) Inventor: Gerald Finkboner, East Apple Valley, CA (US)

(*) Notice: Subject to any disclaimer, the term of this patent is extended or adjusted under 35 U.S.C. 154(b) by 264 days.

(21) Appl. No.: 16/877,632

(22) Filed: May 19, 2020

(51) Int. Cl.
- *B62B 3/02* (2006.01)
- *B66F 5/04* (2006.01)
- *B66F 7/06* (2006.01)
- *B62B 5/00* (2006.01)

(52) U.S. Cl.
CPC .............. *B66F 5/04* (2013.01); *B62B 3/02* (2013.01); *B62B 5/00* (2013.01); *B66F 7/065* (2013.01); *B62B 2206/02* (2013.01); *B66F 2700/057* (2013.01)

(58) Field of Classification Search
CPC ......... B62B 2206/02; B62B 3/02; B62B 5/00; B66F 5/04; B66F 7/065; B66F 2700/057; B66F 5/00
USPC .................................................. 254/134, 2 B
See application file for complete search history.

(56) References Cited

U.S. PATENT DOCUMENTS

| | | | |
|---|---|---|---|
| 1,337,065 A * | 4/1920 | Jose | E21D 1/04 254/DIG. 1 |
| 2,885,181 A | 8/1956 | McCully et al. | |
| 3,086,751 A | 4/1963 | Poznik | |
| 3,315,942 A | 4/1967 | Buberniak | |
| 3,362,351 A * | 1/1968 | Robertson | B61K 5/04 254/84 |
| 3,850,409 A * | 11/1974 | Davis | B66F 13/00 254/133 R |
| 3,907,252 A * | 9/1975 | Gaarder | B66F 5/04 254/8 B |
| 4,123,038 A * | 10/1978 | Meyers | B66F 19/00 414/427 |
| 4,486,936 A * | 12/1984 | Curry | B60B 29/00 254/131 |
| 4,793,592 A * | 12/1988 | Green | B66F 3/24 254/134 |
| 4,850,568 A * | 7/1989 | Hung | B66F 5/04 74/519 |
| 4,925,158 A * | 5/1990 | Yang | B66F 5/04 254/93 H |
| 5,002,256 A * | 3/1991 | Bedford | B66F 5/04 254/134 |

(Continued)

FOREIGN PATENT DOCUMENTS

| | | |
|---|---|---|
| CN | 103938906 | 7/2014 |
| CN | 111056478 A * | 12/2019 |

(Continued)

*Primary Examiner* — Mahdi H Nejad
(74) *Attorney, Agent, or Firm* — Kenneth L Tolar

(57) ABSTRACT

An extendable vehicle jack includes a horizontal frame having a rear section with a front section extendable therefrom. Within the front section is a lifting mechanism including a plate that engages the lower surface of the vehicle as it is being raised and lowered. The lifting mechanism includes a hydraulic pump and cylinder that expand and contract a scissors jack. The front section is automatically extended from the rear section with either a hydraulic or pneumatic cylinder. Accordingly, a worker can position the lifting mechanism any desired location beneath the vehicle frame.

13 Claims, 5 Drawing Sheets

(56) References Cited

U.S. PATENT DOCUMENTS

| | | | | |
|---|---|---|---|---|
| 5,022,105 A | * | 6/1991 | Catoe | A61G 1/0237 |
| | | | | 5/11 |
| 6,581,913 B1 | * | 6/2003 | Conomos | B66F 3/247 |
| | | | | 254/133 R |
| 2007/0235704 A1 | | 10/2007 | Paul | |
| 2017/0369289 A1 | | 12/2017 | Flippin | |

FOREIGN PATENT DOCUMENTS

| | | | |
|---|---|---|---|
| WO | WO2016066964 | * | 5/2016 |
| WO | WO2016066964 A1 | * | 5/2016 |

* cited by examiner

EXTENDABLE VEHICLE JACK

CROSS REFERENCE TO RELATED APPLICATIONS

None.

BACKGROUND OF THE INVENTION

The present invention relates to a vehicle jack having an extendable lifting section that allows a user to easily lift the vehicle at a desired distance from either side.

DESCRIPTION OF THE PRIOR ART

When elevating a vehicle for repair, a worker typically places a floor jack beneath one side of the vehicle and extends a lifting mechanism. Once the vehicle is raised to a desired height, jack stands are placed beneath the vehicle allowing the jack to be relocated to the other side where the task is repeated. Moving the jack from one side of the vehicle to the other is time consuming and laborious. Automobile mechanics and tire shops expend considerable effort and time repeatedly relocating floor jacks in order to lift each of two sides of a vehicle. Accordingly, there is currently a need for a jack that allows a worker to more quickly and safely raise both sides of a vehicle.

Furthermore, when lifting a vehicle, a user typically positions the jack beneath a side and expands the lifting mechanism. Depending upon the vehicle design, the jack must be positioned a predetermined distance inwardly from the side in order to adequately lift the vehicle. However, placing the jack closer to the middle of the vehicle often prevents proper operation of the jack handle. Furthermore, it is often desirable to lift the rear end of the vehicle where a suitable lifting surface is at least several feet from the bumper. In order to properly position the jack, a user must climb beneath the vehicle, which is annoying. Finally, the chassis of many newer model vehicles are close to the ground, making proper positioning of conventional jacks difficult.

A review of the prior art reveals various vehicle jacks but none that are designed to alleviate aforementioned problems. For example, Chinese patent no. CN 103938906 discloses a parking stall with slidable vehicle jacks.

U.S. Pat. No. 2,885,181 to McCully discloses a support jack for lifting trailer tongues.

U.S. Pat. No. 3,086,751 issued to Poznik discloses a hydraulic jack for lifting aircraft landing gear.

U.S. Pat. No. 3,315,942 to Buberniak discloses a lifting jack for a bed-mounted camper unit that moves laterally to clear the truck bed sidewalls.

US patent no. application publication 2007/0235704 Paul to Paul discloses a jack extender for increasing the height to which a conventional jack can lift a vehicle.

US patent no. application publication 2017/0369289 to Flippin discloses a jack having an expandable base for increased stability.

As indicated above, various jacks exist in the prior art. However, none of the above cited references disclose a jack having a base with an extendable section for selectively repositioning a lifting arm. The present invention addresses this need by providing a jack having an extendable section that can be selectively positioned beneath either of two opposing sides of a vehicle without relocating the jack.

SUMMARY OF THE INVENTION

The present invention relates to an extendable vehicle jack including a horizontal frame having a rear section with a front section extendable therefrom. Within the front section is a lifting mechanism including a plate that engages the lower surface of the vehicle as it is being raised and lowered. The lifting mechanism includes a hydraulic pump and cylinder that expand and contract a scissors jack. The front section is automatically extended from the rear section with either a hydraulic or pneumatic cylinder. Accordingly, a worker can raise a vehicle from any desired position beneath the vehicle frame.

It is therefore an object of the present invention to provide a vehicle jack that can be extended and retracted to variably position the lifting mechanism beneath a vehicle.

It is another object of the present invention to provide a vehicle jack that allows a worker to variably position the lifting mechanism beneath a vehicle without relocating the jack.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
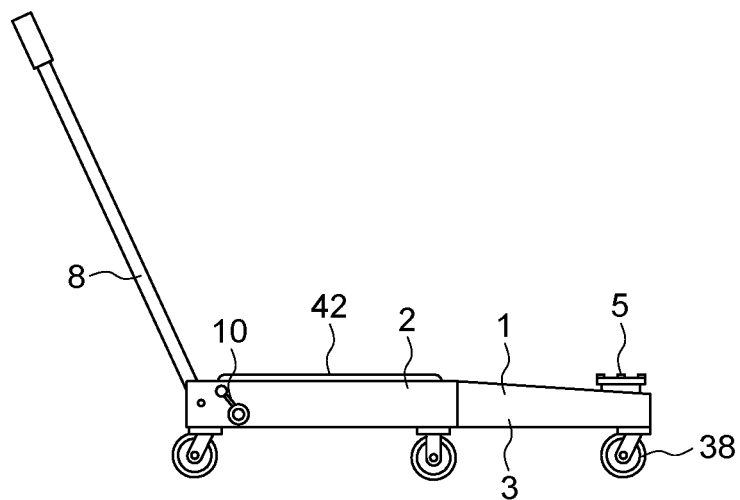
FIG. 1 is a side, plan view of the vehicle jack according to a first embodiment of the present invention.

The present invention relates to an extendable vehicle jack comprising a frame 1 including a rear section 2 and a front section 3 telescopically extendable therefrom. The front section includes channels 4, each of which rides on an elongated rib 41 positioned on each of two opposing inner surfaces of the rear section. Preferably, the frame is mounted on swiveling, locking casters 38 to facilitate relocation.

Figure 2:
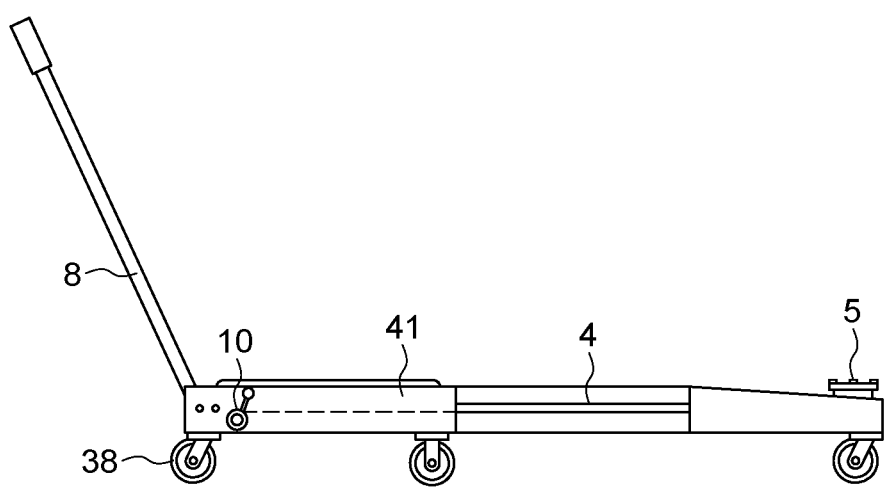
FIG. 2 is a side, plan view of the vehicle jack in an expanded orientation.
Figure 3:
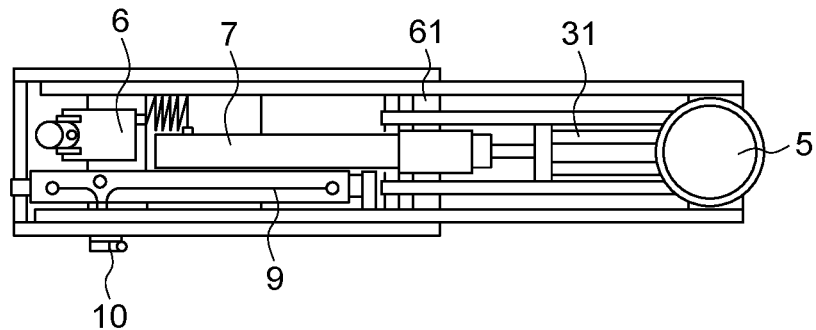
FIG. 3 is a top, plan view of the vehicle jack in a collapsed orientation as depicted in FIG. 1.
Figure 4:
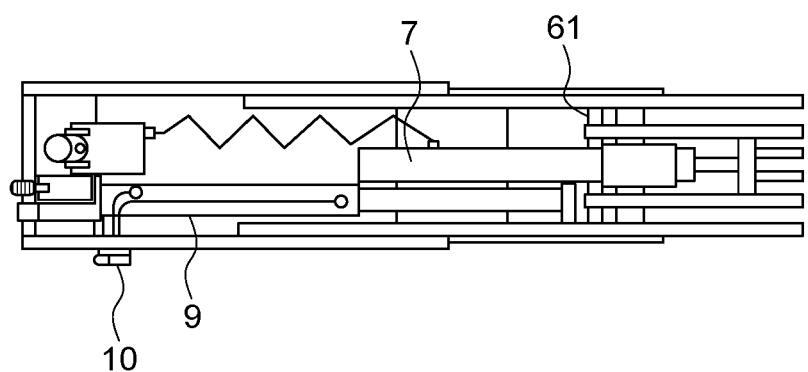
FIG. 4 is a top, plan view of the vehicle jack in an expanded orientation as depicted in FIG. 2.
Figure 5:
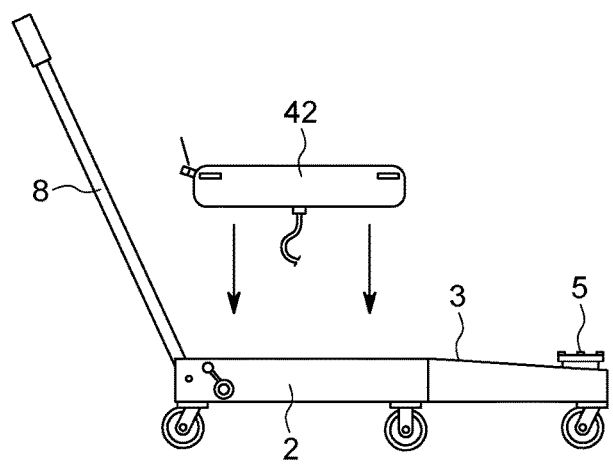
FIG. 5 is a partially exploded view of the vehicle jack depicted in FIGS. 1-3.
Figure 6:
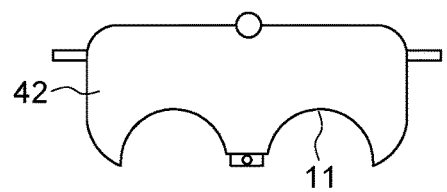
FIG. 6 is an end view of the air reservoir.

The front section is automatically extended from the rear section with either a hydraulic 13 or pneumatic cylinder 9. Referring specifically to FIGS. 1-6, the pneumatic version includes a pneumatic cylinder 9 that is attached at a first end to the rear section and at an opposing end to cross struts 61 on the front section. The pneumatic cylinder is powered by an onboard air reservoir 42 and directional valve. A pivotal lever 10 on a side of the rear section controls the directional valve and, therefore, airflow to and from the pneumatic cylinder. Pivoting the lever in a first direction delivers air from the reservoir to the cylinder thereby extending the cylinder, and thus the front section; pivoting the lever in an opposite direction releases air, thereby retracting the cylinder and the front section. Preferably, the air reservoir includes arcuate indentions 11 on its lower surface allowing it to conform to the pneumatic cylinder 9 and the lifting mechanism cylinder 7 described in more detail, infra. The air reservoir should be replenished after each use.

Figure 7:
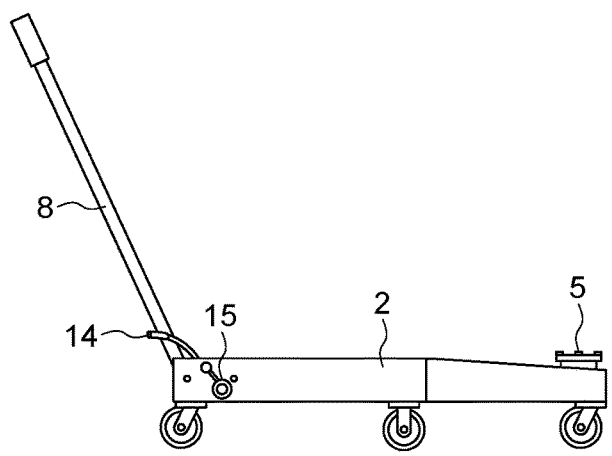
FIG. 7 depicts a second embodiment according to the present invention.
Figure 8:
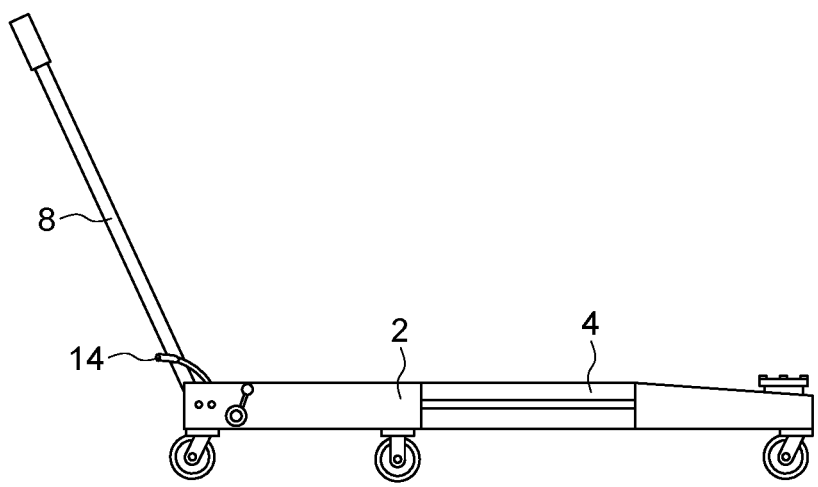
FIG. 8 is a side, plan view of the vehicle jack of FIG. 7 in an expanded orientation.
Figure 9:
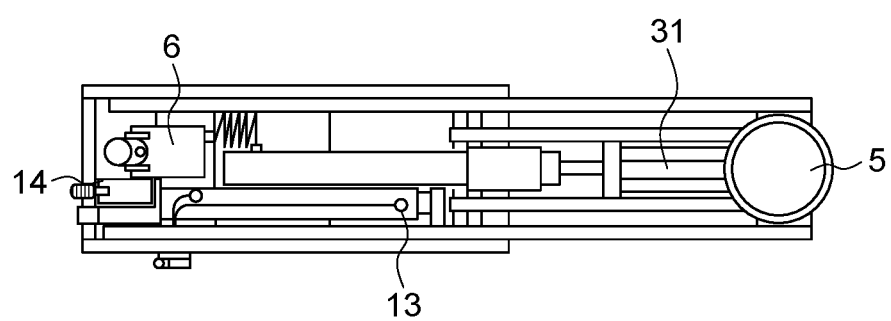
FIG. 9 is a top, plan view of the vehicle jack depicted in FIGS. 7 and 8.
Figure 10:
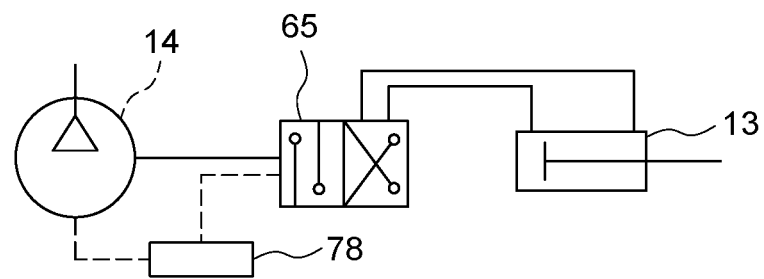
FIG. 10 is a schematic of the hydraulic extension mechanism.
Figure 11:
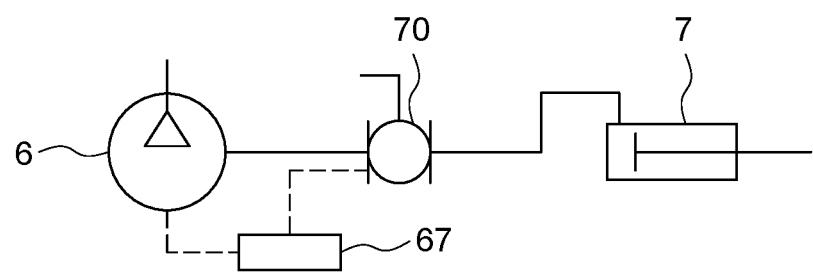
FIG. 11 is a schematic of the lifting mechanism.

Referring specifically to FIGS. 7-10, the hydraulic version includes a hydraulic cylinder 13 that is operated with a hydraulic foot pump 14. As with the pneumatic version, the positioning of a lever 15 on a side of the rear section controls a directional valve 65. Pivoting the lever in a first direction delivers fluid from the pump to the cylinder thereby extending the cylinder, and thus the front section; pivoting the lever in an opposite direction causes the pump to deliver fluid from the cylinder, back to the pump's self-contained fluid reservoir 78, thereby retracting the cylinder.

Within the front section is a lifting mechanism including a plate 5 that engages the lower surface of the vehicle as it is being raised and lowered. The lifting mechanism is conventional and includes a hydraulic pump 6 and cylinder 7 that expand and contract a scissors jack 31. A coiled hose interconnecting the pump and cylinder can expand and contract as the front section is extended and retracted. A pivotal handle 8 extends from the rear section, which operates the hydraulic pump. When an operator rotates the handle clockwise to a first position and then reciprocates the handle, the pump delivers fluid from a self-contained fluid reservoir 67 to the cylinder via a directional valve 70, thereby raising the lifting mechanism. When the operator rotates the handle counterclockwise to a second position and then reciprocates the handle, the pump drains the cylinder, thereby lowering the lifting mechanism. The above-described lifting mechanism is conventional and is found in many vehicle jacks currently in use. Accordingly, the above-described device allows a worker to lift the vehicle from any desired position beneath the frame.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims Therefore, the scope of the invention is only to be limited by the following claims.

What is claimed is:

1. An extendable vehicle jack comprising:
   a frame including a rear section and a front section, said front section having two opposing side portions, each said side portion having a channel thereon;
   said rear section having two opposing inner surfaces, each of said inner surfaces having a rib thereon, each rib of the two ribs slidably received within a respective one of said two channels to assure smooth retraction and extension of said front section;
   a telescoping cylinder having a first end and an opposing second end, the first end attached to the rear section of said frame and said second end attached to the front section of said frame;
   a fluid source;
   a directional valve for establishing selective communication between said fluid source and said cylinder;
   a pivotal lever on a side of the rear section configured to operate said directional valve, said lever pivoting between a first position and a second position, whereby pivoting of the lever to said first position delivers fluid from said fluid source to said cylinder to extend the cylinder, and thus the front section, while pivoting of the lever to the second position removes fluid from said cylinder, thereby retracting said cylinder and said front section;
   a motive means for automatically extending and retracting said telescoping cylinder to automatically extend and retract said front section relative to said rear section;
   a lifting means on said front section for raising a vehicle off of an underlying surface.

2. The extendable vehicle jack according to claim 1 further comprising a foot-actuated pump for reversibly delivering said fluid from said fluid source to said cylinder.

3. The extendable vehicle jack according to claim 1 wherein said lifting means comprises:
   a scissors jack on said front section;
   a plate mounted on said scissors jack for engaging a lower surface of the vehicle as the vehicle is being raised and lowered;
   a hydraulic pump and a hydraulic lift cylinder positioned on said frame and configured to expand and contract said scissors jack.

4. The extendable vehicle jack according to claim 3 wherein said lifting means further comprises a pivotal handle extending from the rear section, said pivotal handle operating said hydraulic pump.

5. The extendable vehicle jack according to claim 4 wherein said handle is rotatable between a first position and a second position, whereby when said handle is in the first position, reciprocation of said handle causes said pump to deliver fluid to the hydraulic lift cylinder thereby expanding said scissor jack, and when said handle is rotated to the second position, reciprocation of said handle causes said pump to drain the cylinder thereby contracting said scissor jack.

6. The extendable vehicle jack according to claim 1 wherein said fluid source is contained within a casing, said casing having indentations formed on a surface thereof for accommodating adjacent objects.

7. The extendable vehicle jack according to claim 1 wherein said frame is mounted on swiveling, locking casters to facilitate relocation.

8. An extendable vehicle jack comprising:
   a frame including a rear section and a front section;
   a telescoping cylinder having a first end and an opposing second end, the first end attached to the rear section of said frame, said second end attached to the front section of said frame;
   a motive means for automatically extending and retracting said telescoping cylinder to automatically extend and retract said front section relative to said rear section;
   a scissors jack on said front section;
   a plate mounted on said scissors jack for engaging a lower surface of a vehicle as the vehicle is being raised and lowered;
   a hydraulic pump and a hydraulic lift cylinder positioned on said frame that and configured to expand and contract said scissors jack;
   a pivotal handle extending from the rear section of said frame for operating said hydraulic pump, said handle rotatable between a first position and a second position, whereby when said handle is in the first position, reciprocation of said handle causes said pump to deliver fluid to the hydraulic lift cylinder thereby expanding said scissor jack, and when said handle is rotated to the second position, reciprocation of said handle causes said pump to drain the cylinder thereby contracting said scissor jack; a lifting means on said front section for raising a vehicle off of an underlying surface.

9. The extendable vehicle jack according to claim 8 wherein:
the front section of said frame includes two opposing side portions, each said side portion having a channel thereon;
the rear section of said frame includes two opposing inner surfaces, each of said inner surfaces having a rib thereon, each rib of the two ribs slidably received within a respective one of said two channels to assure smooth retraction and extension of said front section.

10. The extendable vehicle jack according to claim 8 wherein said motive means comprises:
a fluid source;
a directional valve for establishing selective communication between said fluid source and said cylinder;
a pivotal lever on a side of the rear section configured to operate said directional valve, said lever pivotal between a first position and a second position, whereby pivoting the lever to said first position delivers fluid from said fluid source to said cylinder to extend the cylinder, and thus the front section, while pivoting the lever to the second position removes fluid from said cylinder, thereby retracting said cylinder and said front section.

11. The extendable vehicle jack according to claim 10 further comprising a foot-actuated pump for reversibly delivering said fluid from said fluid source to said cylinder.

12. The extendable vehicle jack according to claim 8 wherein said fluid source is contained within a casing, said casing having indentations formed on a surface thereof for accommodating adjacent objects.

13. The extendable vehicle jack according to claim 8 wherein said frame is mounted on swiveling, locking casters to facilitate relocation.

\* \* \* \* \*